US009710974B2

(12) United States Patent
Ichimura et al.

(10) Patent No.: US 9,710,974 B2
(45) Date of Patent: Jul. 18, 2017

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventors: Ryutaro Ichimura, Tokyo (JP); Toru Nakazawa, Tokyo (JP); Tomoyuki Abe, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 19 days.

(21) Appl. No.: 14/248,630

(22) Filed: Apr. 9, 2014

(65) Prior Publication Data
US 2014/0309027 A1  Oct. 16, 2014

(30) Foreign Application Priority Data

Apr. 11, 2013 (JP) ................. P2013-083041

(51) Int. Cl.
G06T 19/20 (2011.01)
A63F 13/40 (2014.01)
A63F 13/30 (2014.01)

(52) U.S. Cl.
CPC .............. G06T 19/20 (2013.01); A63F 13/10 (2013.01); A63F 13/12 (2013.01);
(Continued)

(58) Field of Classification Search
CPC .................... A63F 9/24; A63F 13/10
See application file for complete search history.

(56) References Cited

U.S. PATENT DOCUMENTS

2006/0188144 A1* 8/2006 Sasaki ................ G06K 9/00281
382/154
2009/0202114 A1* 8/2009 Morin ..................... A63F 13/12
382/118
(Continued)

FOREIGN PATENT DOCUMENTS

EP  2394714  12/2011
EP  2441504  4/2012
(Continued)

OTHER PUBLICATIONS

Office Action from Japan Patent Office (JPO) in Japanese Patent Application No. 2013-083041, dated Apr. 30, 2014, together with a partial English language translation thereof.
(Continued)

Primary Examiner — Dmitry Suhol
Assistant Examiner — Ankit Doshi
(74) Attorney, Agent, or Firm — Greenblum & Bernstein, P.L.C.

(57) ABSTRACT

A video game processing apparatus for controlling progress of a video game while displaying a three-dimensional avatar, arranged within a virtual space, on a display screen of a the display device is provided. A three-dimensional partial model is generated on the basis of two-dimensional image data inputted by a user of the video game processing apparatus. The three-dimensional partial model constitutes at least apart of a body of a three-dimensional avatar, including a face portion of the three-dimensional avatar. A plurality of three-dimensional partial models thus generated is stored in a three-dimensional partial model memory. At least one three-dimensional partial model for each scene in the video game is specified from the plurality of three-dimensional partial models. The display device is caused to display the three-dimensional avatar, which includes the (Continued)

specified three-dimensional partial model, in a corresponding scene on the display screen.

6 Claims, 8 Drawing Sheets

(52) U.S. Cl.
CPC ... *A63F 2300/204* (2013.01); *A63F 2300/305* (2013.01); *A63F 2300/5553* (2013.01); *A63F 2300/695* (2013.01)

(56) References Cited

U.S. PATENT DOCUMENTS

| | | |
|---|---|---|
| 2011/0304607 A1 | 12/2011 | Ito |
| 2012/0094754 A1* | 4/2012 | Suzuki et al. .................. 463/30 |
| 2013/0120425 A1 | 5/2013 | Kuwabara et al. |

FOREIGN PATENT DOCUMENTS

| | | |
|---|---|---|
| JP | 2000-140430 | 5/2000 |
| JP | 2002-517840 | 6/2002 |
| WO | 99/63490 | 12/1999 |
| WO | 2009/133710 | 11/2009 |
| WO | 2011/155068 | 12/2011 |

OTHER PUBLICATIONS

Toshihiro Konma, "Rittaihakase no HELLO! 3DCG Saisyuko (HELLO! of Dr. Three-dimensional 3DCG the Last Lecture)", WinGraphic, vol. 17, pp. 80-83, Japan, MdN Corporation (Jul. 1, 2000), together with a partial English language translation thereof.
Extended European Search Report (EESR) from European Patent Office (EPO) in European Patent Application No. 14164256.1, dated Jul. 7, 2014.

* cited by examiner

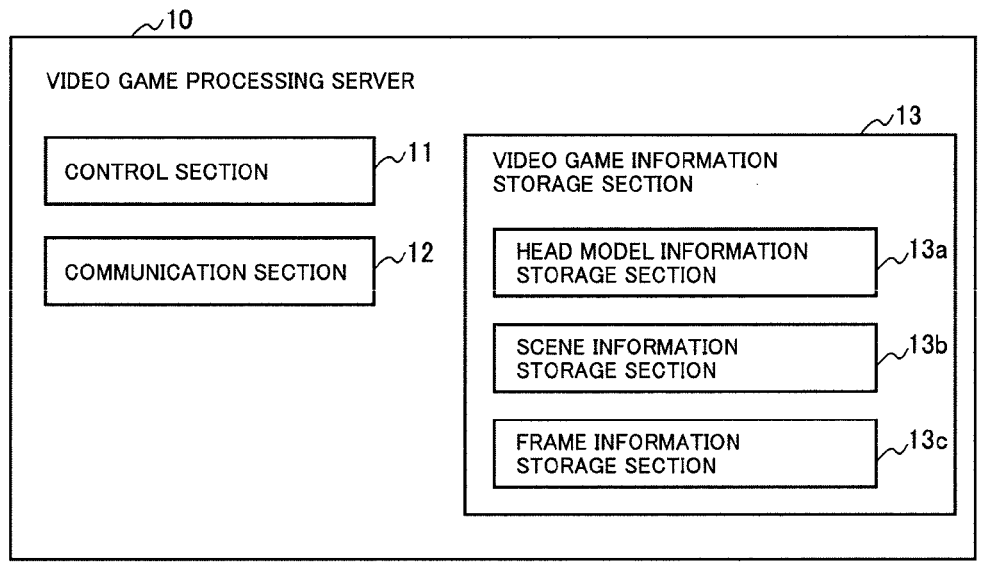

HEAD MODEL INFORMATION

| HEAD MODEL NO. | FACE MODEL INFORMATION | BEARD INFORMATION | HAIR INFORMATION | | SKIN COLOR INFORMATION | ... |
|---|---|---|---|---|---|---|
| | | | HAIR COLOR | HAIR STYLE | | ... |
| HEAD MODEL 1 | FACE MODEL A | BEARD TYPE 1 | COLOR PATTERN 2 | HAIR STYLE PATTERN 5 | COLOR PATTERN 6 | ... |
| HEAD MODEL 2 | FACE MODEL B | BEARD TYPE 3 | COLOR PATTERN 8 | HAIR STYLE PATTERN 1 | COLOR PATTERN 4 | ... |
| ⋮ | ⋮ | ⋮ | ⋮ | ⋮ | ⋮ | ⋮ |

Fig. 4

SCENE INFORMATION

| SCENE | HEAD MODEL NO. |
|---|---|
| SCENE 1 (FOR BATTLE 1) | HEAD MODEL 1 |
| SCENE 2 (FOR CONVERSATION 1) | HEAD MODEL 2 |

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2013-083041, filed on Apr. 11, 2013, the disclosure of which is expressly incorporated herein by reference in its entirety.

BACKGROUND OF THE INVENTION

1. Field of the Invention

The present invention relates to a technique for controlling progress of a video game.

2. Description of the Related Art

Heretofore, there is a video game in which a 3D avatar having a face portion of a picture on the surface is generated by putting a picture of a face photographed by a user on a 3D avatar.

Further, among video games to generate a 3D avatar from a picture, there is one in which each of parts in a face expressed in a picture is detected and the video game is caused to proceed while varying any or some of the detected parts to change facial expression (see Japanese Patent Application Publication No.2002-517840, for example). In such a video game, in order to carry out smooth drawing without damaging reality of the video game, it is necessary to recognize each of parts in a face expressed in a picture by a highly recognition technique, and further to carry out processing to apply various changes to the detected parts.

However, there is required a control apparatus having a suitable processing power in order to recognize each of the parts in the face expressed in the picture by the highly recognition technique and further to carry out the processing to apply various changes to the detected parts. For this reason, there has been a problem that the versatility becomes lower. Namely, it has been required a video game processing apparatus that can cause the video game to proceed using a 3D avatar easily.

SUMMARY OF THE INVENTION

The present invention has been made in order to solve the problem described above, and it is an object of the present invention to provide a video game processing apparatus that can carry out and control progress of the video game using a 3D avatar readily.

In order to achieve the above object, in one aspect of the present invention, the present invention is directed to a video game processing apparatus for controlling progress of a video game while displaying a three-dimensional avatar on a display screen of a display device. In this case, the three-dimensional avatar is arranged within a virtual space on the display screen. The video game processing apparatus according to the present invention includes a three-dimensional partial model generator for generating a three-dimensional partial model on the basis of two-dimensional image data inputted by a user of the video game processing apparatus, the three-dimensional partial model constituting at least a part of a body of a three-dimensional avatar, the part of the body including a face portion of the three-dimensional avatar.

The video game processing apparatus also includes a three-dimensional partial model memory for storing a plurality of three-dimensional partial models generated by the three-dimensional partial model generator The video game processing apparatus also includes a three-dimensional partial model specifier for specifying at least one three-dimensional partial model for each scene in the video game from the plurality of three-dimensional partial models.

The video game processing apparatus also includes an avatar display controller for causing the display device to display the three-dimensional avatar in a corresponding scene on the display screen, the three-dimensional avatar including the three-dimensional partial model specified by the three-dimensional partial model specifier.

By configuring the video game processing apparatus as described above, it is possible to carry out and control progress of the video game using a 3D avatar readily.

In the video game processing apparatus according to the present invention, it is preferable that the video game processing apparatus further includes a scene information memory for storing scene information, the scene information containing at least one scene and one or more three-dimensional partial model corresponding to each of the at least one scene, wherein the face model specifier specifies, when a scene is started, the three-dimensional partial model corresponding to the scene to be started by referring to the scene information memory.

In the video game processing apparatus according to the present invention, it is preferable that the video game processing apparatus further includes: a frame information memory for storing frame information, the frame information containing a frame to be a guide when to generate a three-dimensional partial model on the basis of two-dimensional image data; a three-dimensional partial model generating screen display controller for causing the display device to display a three-dimensional partial model generating screen for generating a three-dimensional partial model; a superimposing display controller for causing the display device to display the two-dimensional image data and the frame on the three-dimensional partial model generating screen so as to be superimposed by referring to the frame information memory, the three-dimensional partial model generating screen being displayed by the three-dimensional partial model generating screen display controller; and a positional relationship determiner for determining a positional relationship between the two-dimensional image data and the frame when an adjustment operation for the positional relationship between the two-dimensional image data and the frame is received from the user, wherein the three-dimensional partial model generator generates the three-dimensional partial model on the basis of the positional relationship determined by the positional relationship determiner and a predetermined calculation formula.

Moreover, in another aspect of the present invention, the present invention is directed to a non-transitory computer-readable medium including a video game processing program product for causing a video game processing apparatus to control progress of a video game while displaying a three-dimensional avatar arranged within a virtual space on a display screen of a display device. In this case, the video game processing apparatus includes a three-dimensional partial model memory for storing a plurality of three-dimensional partial models, each of the plurality of three-dimensional partial models constituting at least a part of a body of a three-dimensional avatar, the part of the body including a face portion of the three-dimensional avatar. The video game processing program product according to the present invention causes the computer to execute steps including generating a three-dimensional partial model on the basis of two-dimensional image data inputted by a user of the video game processing apparatus.

The steps also include specifying at least one three-dimensional partial model from the plurality of three-dimensional partial models, the at least one three-dimensional partial model being used in each scene in the video game.

The steps also include causing the display device to display the three-dimensional avatar in a corresponding scene on the display screen, the three-dimensional avatar including the three-dimensional partial model specified in the specifying at least one three-dimensional partial model.

According to the present invention, it is possible to carry out and control progress of a video game using a 3D avatar readily.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is a block diagram showing an example of a configuration of a video game processing server;

FIG. 3 is an explanatory drawing showing an example of a storage state of head model information;

FIG. 4 is an explanatory drawing showing an example of a storage state of scene information;

DETAILED DESCRIPTION OF THE INVENTION

Figure 1:
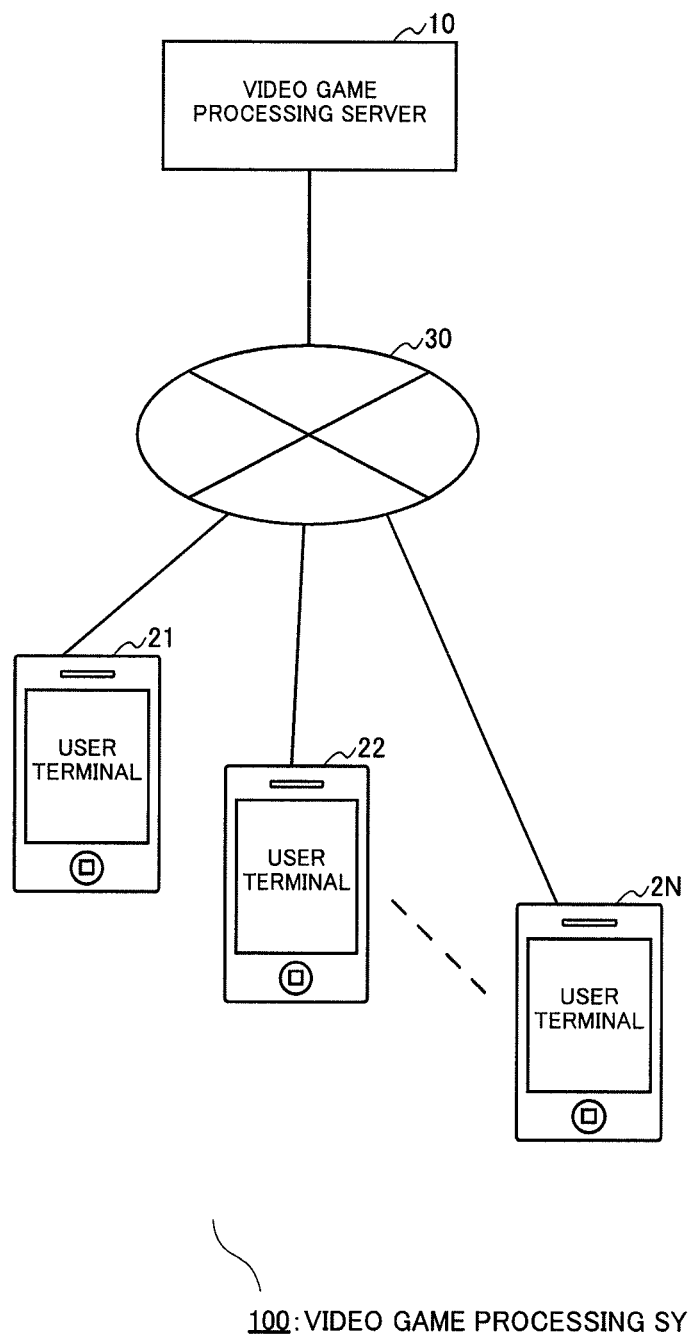
FIG. 1 is a block diagram showing a configuration example of a video game processing system.

FIG. 1 is a block diagram showing an example of a configuration of a video game processing system 100 according to one embodiment of the present invention. As shown in FIG. 1, the video game processing system 100 includes: a video game processing server 10; and a plurality of user terminals 21 to 2N ("N" is an arbitrary integer) respectively used by a plurality of users (players). In this regard, the configuration of the video game processing system 100 is not limited to this configuration. The video game processing system 100 may be configured so that a single user terminal is used by a plurality of users. Alternatively, the video game processing system 100 may be configured so as to include a plurality of servers.

Each of the video game processing server 10 and the plurality of user terminals 21 to 2N is connected to a communication network 30 such as the Internet. In this regard, although it is not shown in the drawings, each of the plurality of user terminals 21 to 2N is connected to the communication network 30 by carrying out data communication with a base station managed by a carrier by means of a wireless communication line.

The video game processing system 100 has various kinds of functions to control progress of a video game (for example, a so-called online game or a social game (that is, a video game provided in an SNS (Social Networking Service))). Each of the plurality of players plays the video game in a virtual space or a virtual area.

The video game processing server 10 is managed by an administrator of the video game processing system 100, and has various kinds of functions to provide (or deliver) information on the video game to the user terminals 21 to 2N.

The video game processing server 10 is configured by an information processing apparatus such as a WWW server, and includes a storage medium for storing various kinds of information. In this regard, it is preferable that in the video game processing system 100, the information regarding the video game is managed by the video game control server 10 in the light of the fact that a processing load on each of the plurality of user terminals 21 to 2N is to be reduced in the video game processing system 100. However, the video game processing system 100 may be configured so that each of the plurality of user terminals 21 to 2N manages part of the information on the video game.

FIG. 2 is a block diagram showing an example of a configuration of the video game processing server 10. As shown in FIG. 2, the video game processing server 10 includes: a control section 11; a communication section 12; and a video game information storage section 13.

The control section 11 includes a CPU, a ROM and the like, and has a function to carry out controls of the whole video game processing server 10 in accordance with control programs stored in the video game information storage section 16.

The communication section 12 has a function to carry out communication with each of the plurality of user terminals 21 to 2N via the communication network 30 such as the Internet.

The video game information storage section 13 is configured by a database apparatus example. The video game information storage section 13 is a storage medium for storing various kinds of information on the video game whose progress is controlled by the video game control system 100 and various kinds of data such as control programs for the video game.

The video game information storage section 13 includes: a head model information storage section 13a; a scene information storage section 13b; and a frame information storage section 13c (see FIG. 2).

The head model information storage section 13a is a storage medium for storing head model information on a head portion of a three-dimensional avatar generated by means of an operational input of the user. FIG. 3 is an explanatory drawing showing an example of a storage state of the head model information stored in the head model information storage section 13a. As shown in FIG. 3, the head model information contains: a head model No. for uniquely specifying a head model; face model information; beard information; hair information; and skin color information, for example.

Here, the face model information is information indicating a three-dimensional face model as a face portion of a three-dimensional avatar to be generated from only two-dimensional image data. Further, the face portion indicates a surface portion of a face when the face is viewed from the front side. More specifically, the face portion indicates, when the face is viewed from the front side, an area from an outline of a chin to a forehead, that is, an area with a substantially square shape in which a lower base becomes a convex toward a lower side thereof. Further, the three-dimensional face model according to the present embodiment does not include constituent parts (for example, beard, hair and the like) constituting a three-dimensional partial model that can be added by means of an operation of the user. In this regard, head model generating processing will be described later in detail.

Here, the beard information is information regarding a shape of beard, and the shape of beard indicated by the beard information is also one kind of the constituent parts of the head model that can be added to the three-dimensional face model by means of an operation of the user.

Here, the hair information is information regarding hair, such as a hair color and a hair style, and the hair indicated by the hair information is also one kind of the constituent parts of the head model that can be added to the three-dimensional face model by means of an operation of the user.

Here, the skin color information is information regarding a skin color, and the skin color indicated by the skin color information is also one kind of the constituent parts of the head model that can be added to the three-dimensional face model by means of an operation of the user. In this regard, the video game processing system 100 may be configured so that the skin color information contains sense of transparently, the degree of glossiness and the like.

The scene information storage section 13b is a storage medium for storing scene information regarding a scene obtained by subdividing actions during progress of the video game. FIG. 4 is an explanatory drawing showing an example of a storage state of the scene information stored in the scene information storage section 13b. As shown in FIG. 4, the scene information contains: a plurality of scenes; and a head model No. corresponding to each of the plurality of scenes, for example.

Here, the scene indicates each of scenes of scenario in the video game. In the present embodiment, the scene includes a battle scene and a conversation scene, for example. Further, the video game processing system 100 may be configured so that the scene includes specific scenes such as a scene in which a predetermined skill (or art) is activated and a scene in which a predetermined conversation is made.

The frame information storage section 13c is a storage medium for storing frame information. The frame information contains a frame that becomes guide when to generate a three-dimensional face model on the basis of two-dimensional image data.

Each of the plurality of user terminals 21 to 2N is managed by the corresponding user (or player) who plays the video game, and is configured by a communication terminal, such as a cellular phone terminal, a PDA (Personal Digital Assistants) and a portable game apparatus, by which the user can play a network delivery-type game, for example. Each of the plurality of user terminals 21 to 2N has hardware (for example, a display device for displaying a game screen, a receiving section for receiving an operational input from the user, an audio output device, and the like) and software to carry out the video game by connecting the corresponding user terminal 21 to 2N to the communication network 30 and carrying out communication with the video game processing server 10. In this regard, the video game processing system 100 may be configured so that the plurality of user terminals 21 to 2N is allowed to directly communicate with each other without the video game processing server 10. Further, the display device in each of the plurality of user terminals 21 to 2N is configured by a touch panel.

Each of the plurality of user terminals 21 to 2N has a photograph function to photograph a photographic subject. The photograph function includes a condensing lens, an area sensor and an Analog-Digital convertor. The condensing lens focuses light from the photographic subject into the area sensor. The area sensor outputs an analog signal based on the focused light to the Analog-Digital convertor. The Analog-Digital convertor converts the outputted analog signal into electronic data.

Next, an operation of the video game processing system 100 according to the present embodiment will be described. In this regard, the content of operations and/or processing with no relationship to the present invention may be omitted.

Figure 5:
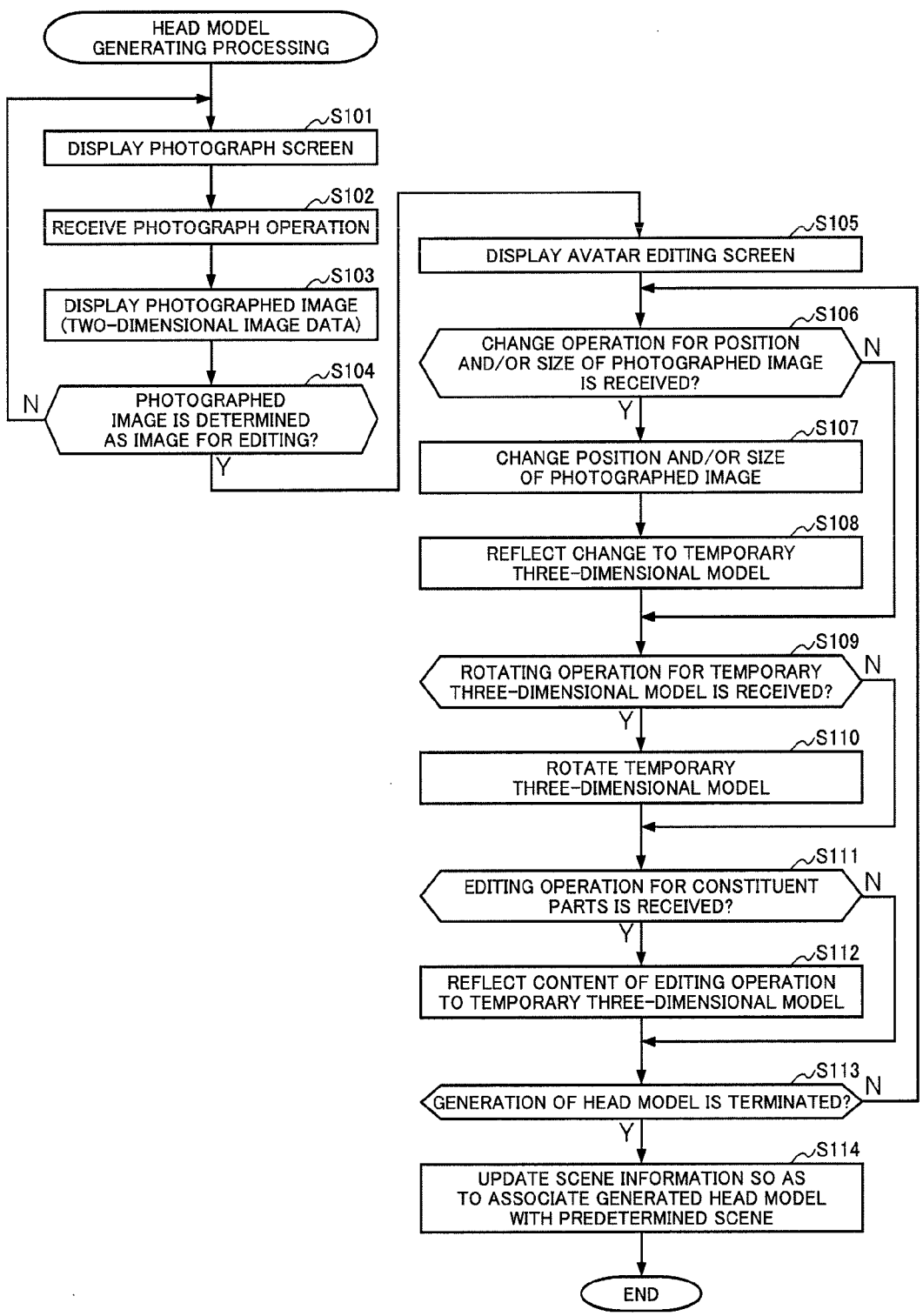
FIG. 5 is a flowchart showing an example of head model generating processing.

FIG. 5 is a flowchart showing an example of head model generating processing carried out by the video game processing server 10 in the video game processing system 100. In the head model generating processing according to the present embodiment, processing to generate a head portion (hereinafter, also referred to as "head model") of a three-dimensional avatar as a three-dimensional partial model arranged within the virtual space on the basis of a photographed image as two-dimensional image data photographed by the user terminal 21 using a camera function thereof is carried out. In this regard, the video game processing system 100 may be configured so that a part of the processing shown in FIG. 5 is carried out by the user terminal 21.

Here, the head model indicates a three-dimensional partial model of an upper portion from the neck. The three-dimensional partial model includes a three-dimensional face model of an upper portion generated from a photographed image and a portion (for example, beard, hair, color and the like) that can be added by means of an operation of the user. Namely, the head model indicates a three-dimensional model obtained by adding accompanying information such as beard and hair to the three-dimensional face model. In this regard, the video game processing server 10 according to the present embodiment is configured so as to cause the display device to display a head model in a temporary three-dimensional model drawing area 302. However, the video game processing server 10 may be configured so as to cause the display device to display a three-dimensional model of the whole body including the three-dimensional face model (hereinafter, which may be referred to as the "three-dimensional avatar").

Figure 6:
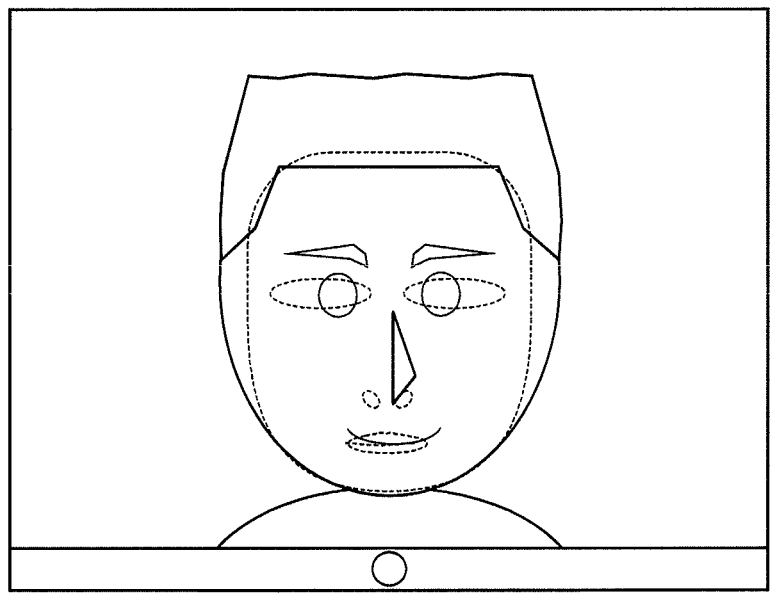
FIG. 6 is a screen drawing showing an example of a display screen for photograph.

In the head model generating processing, the video game processing server 10 first causes the display device to display a photograph screen in order to determine two-dimensional image data that is the basis of a three-dimensional avatar to be arranged within the virtual space before the video game is caused to proceed (Step S101). FIG. 6 is a screen drawing showing an example of a display screen for photograph displayed by the display device of the user terminal 21. As shown in FIG. 6, the display screen for photograph includes: a shutter button for fulfilling the camera function that the user terminal 21 has; and a guide having a shape of an outline of a face. The guide having the shape of the outline of the face is used for alignment of the face when to photograph.

When the photograph screen is displayed, the video game processing server 10 carries out photograph processing in a case where a photograph operation is received from the user (Step S102). In the present embodiment, the photograph processing is carried out in a case where an operation to press the shutter button displayed on the display screen of the display device in the user terminal 21 is received from the user.

When the photograph operation is received and the photograph processing is carried out, the video game processing server 10 causes the display device of the user terminal 21 to display the photographed image (Step S103).

Figure 7:
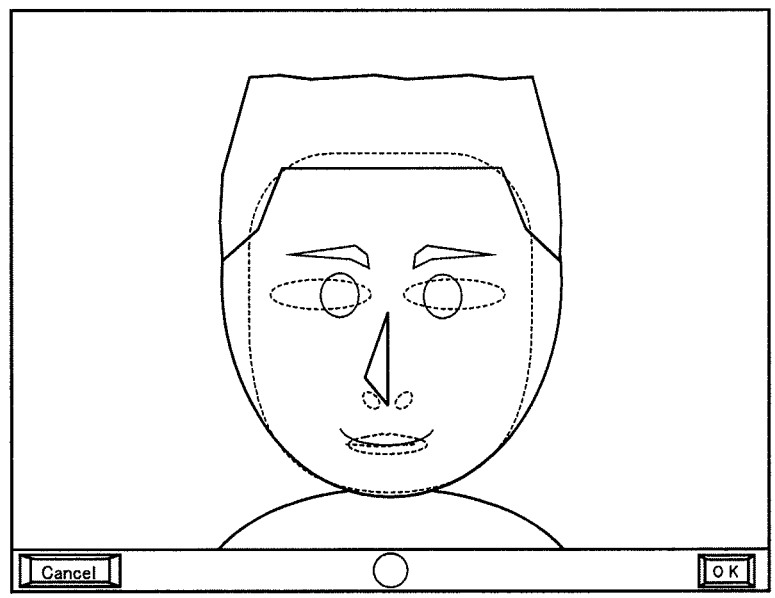
FIG. 7 is a screen drawing showing an example of the display screen on which a photographed image is displayed.

When the display device of the user terminal 21 is caused to display the photographed image, the video game processing server 10 receives an operation for whether the photographed image is to be adopted as two-dimensional image data, which becomes the basis for the three-dimensional face model, or not from the user. Namely, the video game processing server 10 determines whether the photographed image is to be adopted as an image for editing or not (Step S104). FIG. 7 is a screen drawing showing an example of the display screen on which a photographed image is displayed by the display device of the user terminal 21. As shown in FIG. 7, the display screen for displaying a photographed image includes an OK button and a cancel button.

When an operation not to be adopted is received from the user, that is, in a case where it is determined that the photographed image is not to be adopted ("No" at Step S104), the video game processing server 10 causes the processing flow to Step S101, and causes the display device of the user terminal 21 to display the photographed image again. Namely, the video game processing server 10 causes the processing flow to shift to the photograph processing in order to cause the user to retake a picture when a pressing operation to the cancel button is received from the user.

On the other hand, when an operation to be adopted as the two-dimensional image data is received from the user, that is, in a case where it is determined that the photographed image is to be adopted ("Yes" at Step S104), the video game processing server 10 causes the display device of the user terminal 21 to display an avatar editing screen as a head model generating screen for generating a head model including the three-dimensional face model (Step S105). When a pressing operation toward the OK button is received from the user, the video game processing server 10 determines the photographed image as the two-dimensional image data that becomes the basis of the three-dimensional face model, and causes the display device of the user terminal 21 to display the avatar editing screen. In this regard, in the present embodiment, the video game processing system 100 is configured so that the head model is generated using a photographed image that is photographed by the camera function included in the user terminal 21. However, the head model may be generated using images stored in advance in place of the photographed image. Namely, the video game processing server 10 may be configured so as to: cause the processing flow to shift to Step S105 without carrying out the processes at Step S101 to Step S104 when a head model is generated using an image stored in advance; and cause the display device of the user terminal 21 to display the avatar editing screen.

Figure 8:
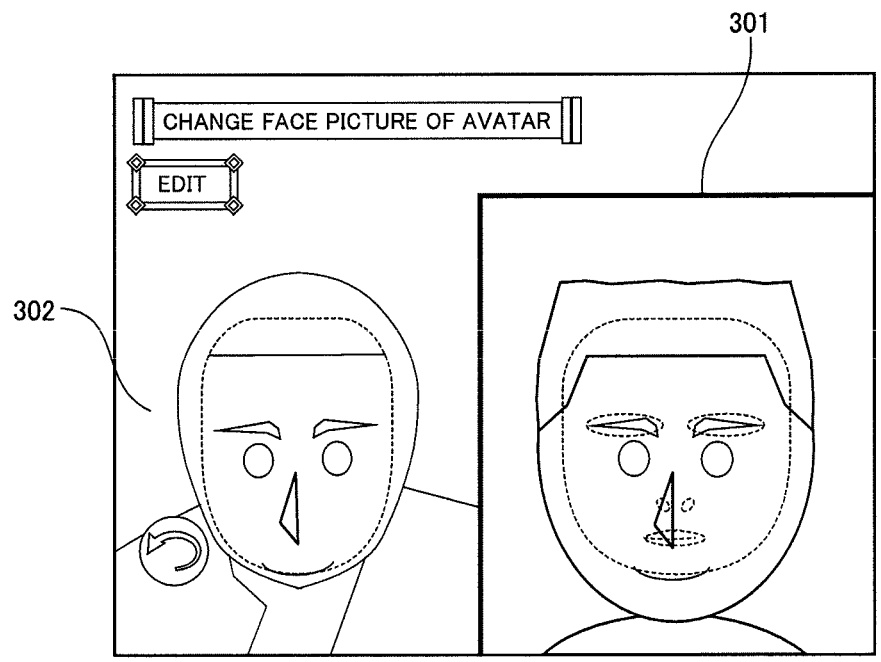
FIG. 8 is a screen drawing showing an example of an avatar editing screen.

FIG. 8 is a screen drawing showing an example of the avatar editing screen. As shown in FIG. 8, the avatar editing screen includes a positional relationship adjusting area 301 and the temporary three-dimensional model drawing area 302.

Here, the positional relationship adjusting area 301 is an area in which the photographed image and the frame are superimposingly displayed by referring to the frame information. The positional relationship adjusting area 301 is also an area in which in a case where a change operation to change at least any one of a position and a size of the two-dimensional image data is received from the user, the positional relationship between the photographed image and the frame can be changed in response to the received change operation. In this regard, the video game processing system 100 is configured so that the positional relationship adjusting area 301 according to the present embodiment receives a change operation for only the photographed image. However, the video game processing system 100 may be configured so as to receive a change operation to change at least anyone of the position and the size of the frame. Alternatively, the video game processing system 100 may be configured so as to receive a change operation for both the two-dimensional image data and the frame.

Here, the temporary three-dimensional model drawing area 302 is an area that the video game processing server 10 causes the display device to display a head model for preview, which is generated on the basis of the positional relationship between the photographed image and the frame in the positional relationship adjusting area 301.

In this regard, the three-dimensional face model is generated by a well-known three-dimensional model generating method. For example, the video game processing server 10 stores a face model for three-dimensional synthesis, a decal texture to be projected onto the face model (projection decal texture), and a texture to be synthesized to the projection decal texture (mask texture); synthesizes the photographed image to the projection decal texture using the mask texture; and projecting the synthesized projection decal texture onto the face model, thereby generating a face avatar of a three-dimensional model.

When the avatar editing screen is displayed, the video game processing server 10 determines whether a change operation for a position and/or a size of the photographed image is received from the user or not (Step S106). In a case where it is determined that a change operation for the position and/or the size of the photographed image is not received ("No" at Step S106), the video game processing server 10 determines whether a rotating operation for the temporary three-dimensional model is received from the user or not (Step S109).

Figure 9:
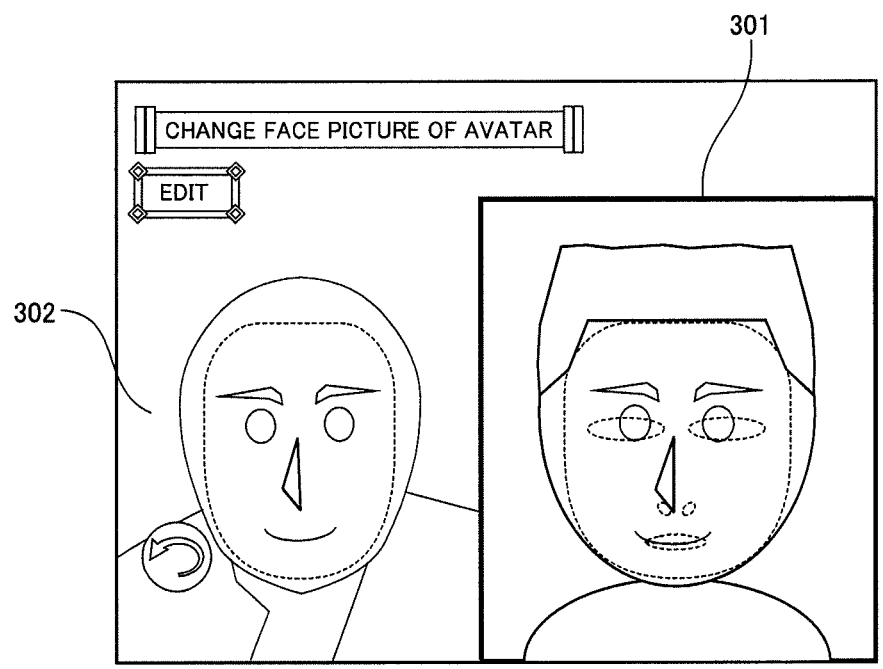
FIG. 9 is a screen drawing showing an example of the display screen after an operation of a user against the display screen shown in FIG. 8 is received.

On the other hand, in a case where it is determined that a change operation for the position and/or the size of the photographed image is received ("Yes" at Step S106), the video game processing server 10 changes the position and/or the size of the photographed image in accordance with the change operation (Step S107), and changes drawing of the temporary three-dimensional model in accordance with the change of the position and/or the size, that is, reflects the change of the position and/or the size to the temporary three-dimensional model (Step S108). FIG. 9 is a screen drawing showing an example of the display screen after an operation of the user against the display screen shown in FIG. 8 is received. When an operation to move the photographed image displayed on the display screen shown in FIG. 8 in an upper direction is received, as shown in FIG. 9, the video game processing server 10 causes the display device to display the photographed image in the positional relationship adjusting area 301 so as to move the photographed image in the upper direction by the movement amount according to the operation amount of the operation by the user, and changes the drawing of the temporary three-dimensional model in the temporary three-dimensional model drawing area 302.

When the position and/or size of the photographed image is changed in response to the operation of the user and the drawing of the temporary three-dimensional model is changed in accordance with a change in the positional relationship between the photographed image and the frame, the video game processing server 10 determines whether a rotating operation for the temporary three-dimensional model is received from the user or not (Step S109). In a case where it is determined that the rotating operation for the temporary three-dimensional model is not received from the user ("No" at Step S109), the video game processing server 10 determines whether an editing operation for the constituent parts that indicates the respective parts constituting the head model is received or not (Step S111).

Figure 10:
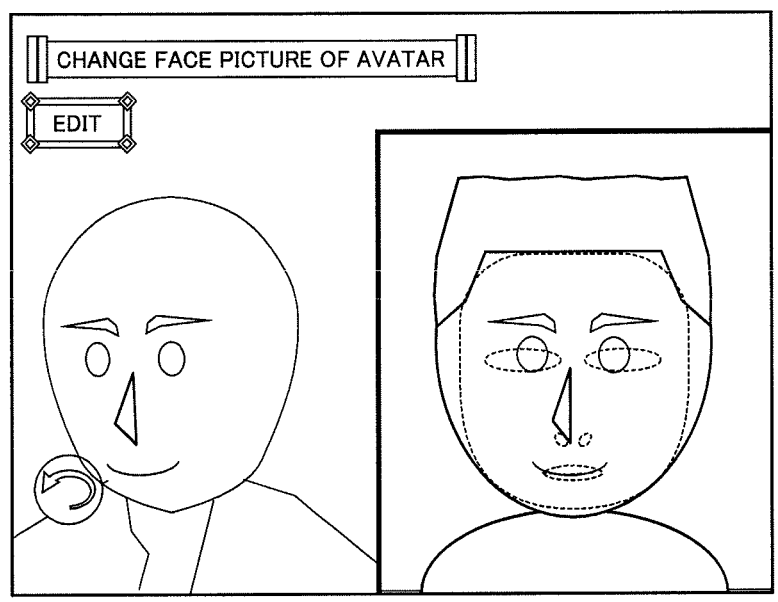
FIG. 10 is a screen drawing showing an example of the display screen after an operation of the user against the display screen shown in FIG. 9 is received.

On the other hand, in a case where it is determined that the rotating operation for the temporary three-dimensional model is received from the user ("Yes" at Step S109), the video game processing server 10 rotates the temporary three-dimensional model in response to an operation of the user (Step S110). FIG. 10 is a screen drawing showing an example of the display screen after an operation of the user against the display screen shown in FIG. 9 is received. When an operation to move the temporary three-dimensional model displayed on the display screen shown in FIG. 9 in a lower left direction is received, as shown in FIG. 10, the video game processing server 10 rotationally moves the temporary three-dimensional model by the movement amount according to the operation amount of the operation by the user and causes the display device to display the rotated temporary three-dimensional model.

When the temporary three-dimensional model is rotated in response to the operation of the user, the video game processing server 10 determines whether an editing operation for the constituent parts that indicates the respective parts constituting the head model is received or not (Step S111). In a case where it is determined that no editing operation is received ("No" at Step S111), the video game processing server 10 determines whether a termination operation to terminate the generation of the head model is received from the user or not (Step S113).

Figure 11:
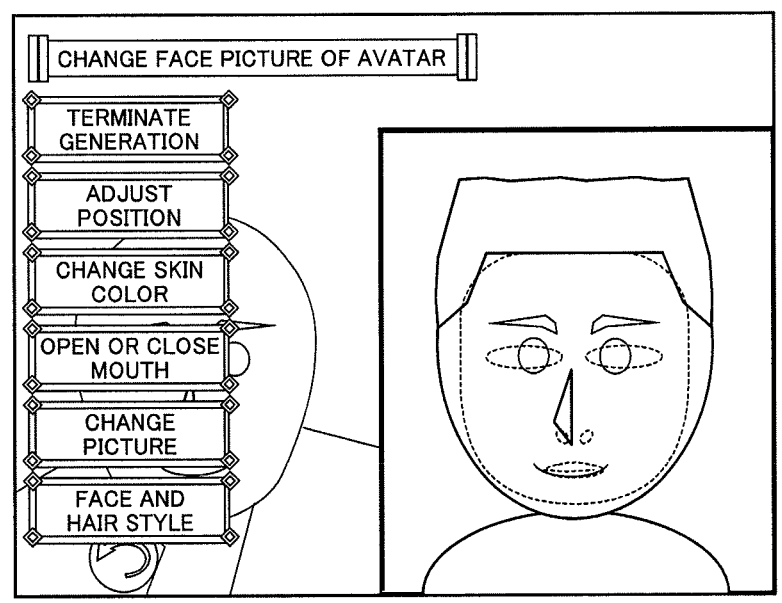
FIG. 11 is a screen drawing showing an example of the display screen for causing the user to carry out an editing operation for constituent parts.
Figure 12:
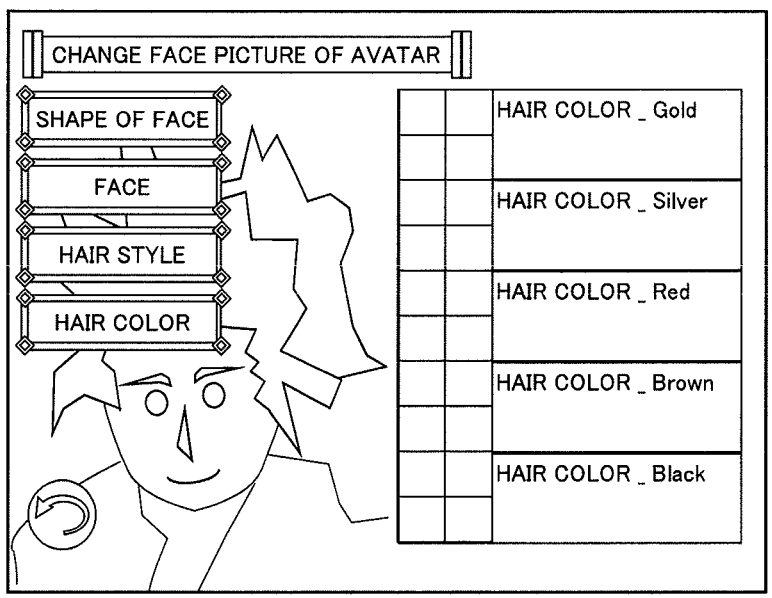
FIG. 12 is a screen drawing showing an example of the display screen displayed when a pressing operation onto an edit item button displayed on an editing operation screen is carried out.

On the other hand, in a case where it is determined that an editing operation is received ("Yes" at Step S111), the video game processing server 10 changes the drawing of the temporary three-dimensional model in accordance with the content of the editing operation received from the user, that is, reflects the content of the editing operation to the temporary three-dimensional model (Step S112). FIG. 11 is a screen drawing showing an example of an editing operation screen for causing the user to carry out an editing operation for constituent parts. As shown in FIG. 11, the editing operation screen for parts includes an edit item button for causing the user to carryout an editing operation for the constituent parts and a generation completing button indicating completion of the generation. Further, FIG. 12 is a screen drawing showing an example of the display screen displayed when a pressing operation onto the edit item button displayed on the editing operation screen is carried out. In the present embodiment, when a selection operation for an editing item "face and hair style" is received, the video game processing server 10 causes the display device to selectably display the editing item such as a "shape of the face", a "face", a "hair style", a "hair color" and the like on the display screen as shown in FIG. 12. For example, when a selection operation for a "hair color" is received, the video game processing server 10 causes the display device to selectably display a plurality of selectable color patterns. When a selection operation for one color pattern is received from the user, the video game processing server 10 changes a color of a hair portion of the temporary three-dimensional model into the received color.

When the editing operation for the constituent parts is received from the user and the drawing of the temporary three-dimensional model is changed in accordance with the content of the editing operation, the video game processing server 10 determines whether the generation of the head model is terminated or not (Step S113). Namely, the video game processing server 10 determines whether an operation that indicates completion of the generation of the head model is received from the user or not. Ina case where it is determined that the generation of the head model is not terminated ("No" at Step S113), the video game processing server 10 causes the processing flow to shift to Step S106, and determines whether a change operation for the position and/or the size of the photographed image is received from the user again or not.

On the other hand, in a case where it is determined that the generation of the head model is to be terminated, the video game processing server 10 stores the head model information regarding the generated head model so as to be associated with the head model NO. by which the head model can be uniquely specified, and updates the scene information so as to associate the head model NO. of the generated head model with a predetermined scene (Step S114). Namely, the video game processing server 10 stores the head model information containing the three-dimensional face model generated on the basis of the positional relationship between the photographed image and the frame, constituent parts information received by displaying the avatar editing screen, and the head model NO.

When the head model information is stored and the scene information is updated, the video game processing server 10 terminates the head model generating processing. In this regard, the video game processing server 10 stores a plurality of head models by causing the user to carry out the head model generating processing plural times.

Figure 13:
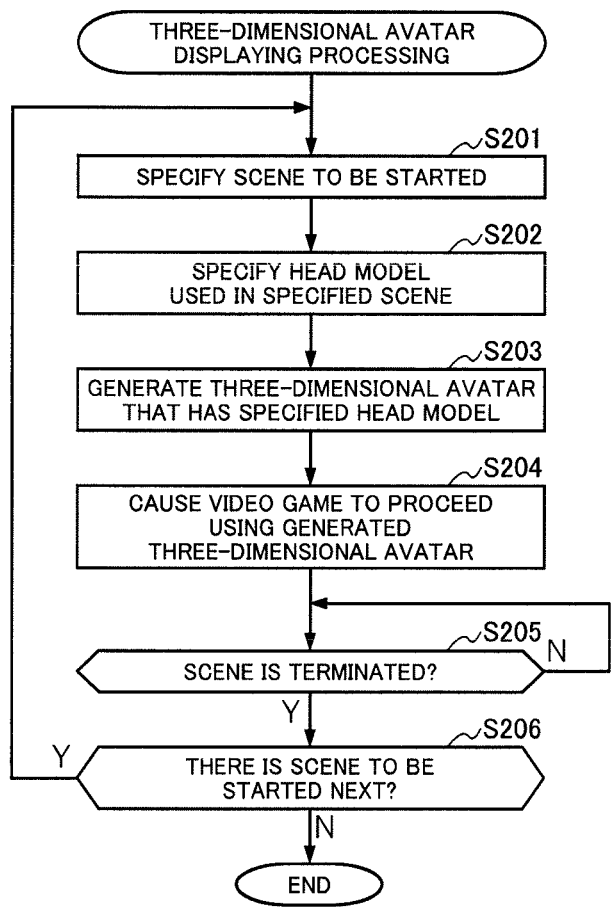
FIG. 13 is a flowchart showing an example of three-dimensional avatar displaying processing.

Next, an example of three-dimensional avatar displaying processing to display a three-dimensional avatar in accordance with progress of the video game will be described. FIG. 13 is a flowchart showing an example of the three-dimensional avatar displaying processing carried out by the video game processing server 10 in the video game processing system 100.

In the three-dimensional avatar displaying processing, the video game processing server 10 first specifies a scene of scenario to be started (Step S201).

When the scene to be started is specified, the video game processing server 10 specifies a head model used in the specified scene (Step S202). Namely, the video game processing server 10 specifies a three-dimensional partial model used in each scene in the video game from a plurality of three-dimensional partial models.

When the head model used in the specified scene is specified, the video game processing server 10 generates a three-dimensional avatar that has the specified head model (Step S203). In this regard, in the present embodiment, the video game processing server 10 is configured so as to specify the head model; and generate the three-dimensional avatar on the basis of the specified head model. However, the video game processing server 10 may be configured so as to specify a three-dimensional face model generated from a photographed image and a frame; and generate a three-dimensional avatar using the specified three-dimensional face model. Namely, the video game processing server 10 may be configured so as to set up annexed information such as beard and hair in advance; specify a three-dimensional face model; and generate a three-dimensional avatar using the specified three-dimensional face model.

When the three-dimensional avatar is generated, the video game processing server 10 causes the video game to proceed using the generated three-dimensional avatar (Step S204). Namely, the video game processing server 10 causes the display device to display the three-dimensional avatar including the three-dimensional partial model in the corresponding scene on the display screen.

When the video game is caused to proceed, the video game processing server 10 determines whether the specified scene is terminated or not (Step S205). In a case where it is determined that the specified scene is not terminated ("No" at Step S205), the video game processing server 10 causes the processing flow to proceed to Step S205, and determines whether the scene is terminated or not again (that is, the processing flow waits at Step S205 until the specified scene is terminated).

On the other hand, in a case where it is determined that the scene is terminated ("Yes" at Step S205), the video game processing server 10 determines whether there is a scene to be started next or not (Step S206). In a case where it is determined that there is a scene to be started next ("Yes" at Step S206), the video game processing server 10 causes the processing flow to proceed to Step S201, and specifies a scene to be started next.

On the other hand, in a case where it is determined that there is no scene to be started next ("No" at Step S206), the video game processing server 10 terminates the three-dimensional avatar displaying processing.

As explained above, in the embodiment described above, the video game processing apparatus (for example, the video game processing server 10, the user terminals 21 to 2N or the video game processing system 100; The same applies hereinafter.) for controlling progress of the video game while displaying the three-dimensional avatar arranged within the virtual space on the display screen is configured so as to: generate a three-dimensional partial model constituting at least a part of the body of the three-dimensional avatar on the basis of the two-dimensional image data inputted by the user, the part of the body including a face portion of the three-dimensional avatar (for example, Step S113); store the plurality of generated three-dimensional partial model (for example, Step S114); specify at least one three-dimensional partial model for each scene in the video game from the plurality of three-dimensional partial models (for example, Step S202); and causes the display device to display the three-dimensional avatar including the specified three-dimensional partial model in the corresponding scene on the display screen (for example, Step S204). For that reason, it is possible to carry out and control progress of the video game using a 3D avatar readily.

Further, in the embodiment described above, the video game processing apparatus is configured so as to: include a storage section for storing the scene information, the scene information containing scenes and three-dimensional partial models corresponding to any of the scenes; and specify, when to start the scene, the three-dimensional partial model corresponding to the scene to be started (for example, Step S202). Therefore, it is possible to use a three-dimensional avatar in progress of the video game while reducing processes to be carried out by the video game processing apparatus.

Further, although it has not been mentioned particularly in the embodiment described above, the video game processing apparatus may be configured so as to generate a plurality of three-dimensional partial models with a form according to the scene. For example, the video game processing apparatus may be configured so as to: store scene correspondence facial expression information containing a scene and a calculating formula that can generate a facial expression corresponding to the scene; generate a three-dimensional partial model by referring to the scene correspondence facial expression information; and update the scene information so as to associate the generated three-dimensional partial model with the corresponding scene. By configuring the video game processing apparatus in this manner, it is possible to use a three-dimensional avatar having a facial expression according to a scene for progress of the video game without generating a three-dimensional model that causes a high processing load. Therefore, it is possible to carry out and control progress of the video game using a 3D avatar readily.

Further, in the embodiment described above, the video game processing apparatus is configured so as to: include the frame information storage section 13*c* for storing the frame information, the frame information containing a frame that becomes a guide when to generate a three-dimensional partial model on the basis of two-dimensional image data; cause the display device to display the three-dimensional partial model generating screen for generating a three-dimensional partial model (for example, Step S105); cause the display device to superimposing display the two-dimensional image data and the frame on the three-dimensional partial model generating screen thus displayed by referring to the frame information storage section 13*c* (for example, Step S105); receive an adjustment operation for the positional relationship between the two-dimensional image data and the frame from the user (for example, Step S106); determine the positional relationship between the two-dimensional image data and the frame (for example, Step S107); and generate the three-dimensional partial model on the basis of the determined positional relationship and a predetermined calculation formula (for example, Step S114). Therefore, it is possible for the user to generate a 3D avatar with high reality without requiring highly (or advanced) processing such as face recognizing processing.

In this regard, in the embodiment described above, the video game processing apparatus is configured so as to include the scene information storage section 13*b* for storing, when a head model is generated, the generated head model and the scene so as to be associated with each other. However, the video game processing apparatus may be configured so as to: include a storage section for storing the frame information in which a predetermined scene is associated with the frame displayed on the avatar editing screen; selectably present frames to the user; receive a selection operation from the user; and associate the generated head model with the scene by displaying the avatar editing screen on the basis of the frame selected by the user.

Further, in the embodiment described above, the video game processing apparatus is configured so as to: include the scene information storage section 13*b* for storing, when the head model is generated, the generated head model and the scene so as to be associated with each other; and specify the head model associated with the scene to be started. However, the video game processing apparatus may be configured so as to specify a head model at random when to start a scene.

In this regard, although it has not been mentioned particularly in the embodiment described above, the video game processing apparatus may be configured so as to generate a three-dimensional partial model including a head portion from two-dimensional image data. Namely, the video game processing apparatus may be configured so as to: generate a portion model on the basis of the two-dimensional image data inputted by the user, the portion model constituting a portion of a body of the three-dimensional avatar; include a portion model storage section for storing a plurality of portion models thus generated; specify at least one portion model for each scene in the video game from the plurality of portion models; and cause the display device to display a three-dimensional avatar having the specified portion model in the corresponding scene on the display screen. By configuring the video game processing apparatus in this manner, it is possible to use a variety of three-dimensional avatars in accordance with scenes of the video game with a low information processing load, and this makes it possible to provide a versatile video game using the variety of three-dimensional avatars.

In this regard, the video game processing system 100 may be configured so as to include the video game processing server 10 having a function to carry out various kinds of processings (for example, rendering) used to carry out the video game and the user terminal 21 having a function for outputting output information (for example, the game screen, audio information and the like) received from the video game processing server 10 and a function to receive an input from the user. Namely, the video game processing system 100 may be configured as a so-called cloud gaming system.

In this regard, the configuration of the video game processing system 100 is not limited to the configuration described above. For example, the video game processing system 100 may be configured so that the video game processing server 10 carries out a part or all of the processings, which have been explained as the processings carried out by the user terminals 21 to 2N, or any of the plurality of the user terminals 21 to 2N (for example, the user terminal 21) carries out a part or all of the processings, which have been explained as the processings carried out by the video game processing server 10 (further, including a configuration in which each of the user terminals 21 to 2N is not connected to the video game processing server 10). Further, the video game processing system 100 may be configured so that each of the user terminals 21 to 2N includes a part or all of the storage sections included in the video game processing server 10. Namely, the video game processing system 100 may be configured so that any one of the user terminal 21 and the video game processing server 10 in the video game processing system 100 includes a part or all of the functions included in the other.

INDUSTRIAL APPLICABILITY

The present invention is useful for a video game that proceeds using a 3D avatar

What is claimed is:

1. A video game processing apparatus for controlling progress of a video game while displaying a three-dimensional avatar on a display screen of a display device, the three-dimensional avatar being arranged within a virtual space, the video game processing apparatus comprising:

a three-dimensional model generator for generating a three-dimensional partial model on a basis of two-dimensional image data inputted by a user of the video game processing apparatus, the three-dimensional partial model constituting at least a part of a body of a three-dimensional avatar, the part of the body including a face portion of the three-dimensional avatar;

a memory for storing a plurality of three-dimensional partial models generated by the three-dimensional model generator;

a processor for specifying at least one three-dimensional partial model for each scene in the video game from the plurality of three-dimensional partial models; and the processor for causing the display device to display the three-dimensional avatar in a corresponding scene on the display screen, the three-dimensional avatar including the three-dimensional partial model specified by the processor, wherein the three-dimensional model generator generates each of the plurality of three-dimensional partial models including a three-dimensional face model, the three-dimensional face model being generated by a synthesis of a two-dimensional image of the two-dimensional image data, a drawing of the three-dimensional face model being changed based on at least one operation received from the user.

2. The video game processing apparatus according to claim 1, wherein the memory further stores scene information, the scene information containing at least one scene and at least one three-dimensional partial model corresponding to the at least one scene, and the processor specifies, when a scene is started, the three-dimensional partial model corresponding to the scene to be started by referring to the scene information stored in the memory.

3. The video game processing apparatus according to claim 1, wherein the memory further stores frame information, the frame information containing a frame to be a guide when to generate the three-dimensional partial model on the basis of the two-dimensional image data, the video game processing apparatus further comprises a display controller for causing the display device to display a three-dimensional partial model generating screen for generating the three-dimensional partial model, the display controller causes the display device to display the two-dimensional image data and the frame on the three-dimensional partial model generating screen so as to be superimposed by referring to the frame information stored in the memory, the processor determines a positional relationship between the two-dimensional image data and the frame when an adjustment operation for the positional relationship between the two-dimensional image data and the frame is received from the user, and the three-dimensional model generator generates the three-dimensional partial model on the basis of the positional relationship determined by the processor and a predetermined calculation formula.

4. The video game processing apparatus according to claim 1, wherein each scene in the video game starts based on the progress of the video game and terminates based on the progress of the video game.

5. The video game processing apparatus according to claim 1, wherein at least one scene includes at least one of a battle scene a conversation scene.

6. A non-transitory computer-readable medium including a video game processing program product for causing a video game processing apparatus to control progress of a video game while displaying a three-dimensional avatar arranged within a virtual space on a display screen of a display device, wherein the video game processing apparatus comprises a memory for storing a plurality of three-dimensional partial models, each of the plurality of three-dimensional partial models constituting at least a part of a body of a three-dimensional avatar, the part of the body including a face portion of the three-dimensional avatar, the video game processing program product causes the video game processing apparatus to execute:

generating a three-dimensional partial model on a basis of two-dimensional image data inputted by a user of the video game processing apparatus;

specifying at least one three-dimensional partial model for each scene in the video game from the plurality of three-dimensional partial models; and causing the display device to display the three-dimensional avatar in a corresponding scene on the display screen, the three-dimensional avatar including the three-dimensional partial model specified in the specifying at least one three-dimensional partial model, and each of the plurality of three-dimensional partial models is generated to include a three-dimensional face model, the three-dimensional face model being generated by a synthesis of a two-dimensional image of the two-dimensional image data, a drawing of the three-dimensional face model being changed based on at least one operation received from the user.

* * * * *